(12) United States Patent
Chang et al.

(10) Patent No.: US 7,096,931 B2
(45) Date of Patent: Aug. 29, 2006

(54) INCREASED HEAT EXCHANGE IN TWO OR THREE PHASE SLURRY

(75) Inventors: Min Chang, McLean, VA (US); Richard Frank Bauman, Bellingham, WA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 207 days.

(21) Appl. No.: 09/877,610

(22) Filed: Jun. 8, 2001

(65) Prior Publication Data

US 2003/0079867 A1    May 1, 2003

(51) Int. Cl.
F28F 13/18    (2006.01)
F28F 19/02    (2006.01)
F28F 9/04    (2006.01)
F28F 1/36    (2006.01)
F28F 1/14    (2006.01)

(52) U.S. Cl. ............... 165/133; 165/80.3; 165/104.16; 165/163; 165/111; 165/113; 165/117; 165/177; 165/179; 165/183; 165/184; 165/185; 422/146; 422/173; 422/175

(58) Field of Classification Search ............. 165/80.3, 165/104.16, 133, 111, 113, 117, 163, 177, 165/185, 183, 184, 911; 422/146, 173, 175
See application file for complete search history.

(56) References Cited

U.S. PATENT DOCUMENTS

| | | | |
|---|---|---|---|
| 4,086,959 A | | 5/1978 | Habdas ........................ 165/155 |
| 4,236,578 A | * | 12/1980 | Kreith et al. ................ 165/181 |
| 4,330,036 A | * | 5/1982 | Satoh et al. ................. 165/179 |
| 4,411,877 A | * | 10/1983 | Notman ....................... 423/359 |
| 4,438,807 A | * | 3/1984 | Mathur et al. ............... 165/133 |
| 4,683,121 A | * | 7/1987 | Goudriaan et al. .......... 422/197 |
| 4,714,049 A | * | 12/1987 | McCoy et al. ............... 122/4 D |
| 4,715,809 A | * | 12/1987 | Langhoff et al. ............ 431/170 |
| 5,186,252 A | * | 2/1993 | Nishizawa et al. .......... 165/181 |
| 5,203,404 A | * | 4/1993 | Chiang et al. ............... 165/133 |
| 5,251,693 A | * | 10/1993 | Zifferer ....................... 165/160 |
| 5,590,711 A | * | 1/1997 | Ishida et al. ................. 165/179 |
| 5,832,995 A | * | 11/1998 | Chiang et al. ............... 165/179 |
| 5,992,512 A | * | 11/1999 | Tsuri et al. .................. 165/133 |
| 5,996,686 A | * | 12/1999 | Thors et al. ................. 165/179 |
| 6,056,048 A | * | 5/2000 | Takahashi et al. ........... 165/184 |
| 6,098,420 A | * | 8/2000 | Furukawa et al. ............ 62/484 |
| 6,173,762 B1 | * | 1/2001 | Ishida et al. ................. 165/133 |
| 6,427,767 B1 | * | 8/2002 | Mougin ....................... 165/133 |

(Continued)

FOREIGN PATENT DOCUMENTS

DE    926784    4/1955    ................. 120/103

(Continued)

Primary Examiner—Henry Bennett
Assistant Examiner—Nihir Patel
(74) Attorney, Agent, or Firm—Mark D. Marin (57) ABSTRACT

Ribbed heat exchange tubes in which the aspect ratio of the ribs is less than 5, provide greater indirect heat exchange than conventional heat exchange tubes with or without fins, when used in a slurry comprising a liquid phase, in which is dispersed flowing gas bubbles or particulate solids and flowing gas bubbles. The ribs, and typically also the longitudinal axis of the heat exchange tubes, are aligned in a direction parallel to, or spirally along the gas bubble flow direction. This is useful to increase either (i) the productivity of a slurry Fischer-Tropsch hydrocarbon synthesis reactor without an increase in the temperature in the reactor or (ii) increasing the production of higher molecular weight hydrocarbons by reducing the reaction temperature at a given feed conversion.

31 Claims, 5 Drawing Sheets

U.S. PATENT DOCUMENTS

| | | | |
|---|---|---|---|
| 6,488,078 B1 * | 12/2002 | Beutler et al. | 165/133 |
| 6,488,079 B1 * | 12/2002 | Zifferer | 165/133 |
| 6,655,451 B1 * | 12/2003 | Tada et al. | 165/179 |
| 2001/0006106 A1 * | 7/2001 | Beutler et al. | 165/184 |
| 2002/0121361 A1 * | 9/2002 | Zifferer | 165/133 |
| 2003/0015316 A1 * | 1/2003 | Burkay | 165/179 |

FOREIGN PATENT DOCUMENTS

FR 996140 8/1949

* cited by examiner

INCREASED HEAT EXCHANGE IN TWO OR THREE PHASE SLURRY

BACKGROUND OF THE DISCLOSURE

1. Field of the Invention

The invention relates to increased heat exchange in a two or three phase, liquid continuous slurry that contains gas bubbles. More particularly, the invention relates to increasing indirect heat transfer into or out of a liquid continuous, two or three phase slurry in a vessel, by using ribbed tube heat exchangers, in which the ribs are aligned generally along the longitudinal axis of the tubes and parallel to the overall flow direction of the gas bubbles, with the aspect ratio of the ribs less than 5 and with the ratio of the base tube O.D. to the rib height greater than 10. This is useful for increasing the productivity of a slurry Fischer-Tropsch hydrocarbon synthesis reactor.

2. Background of the Invention

Chemical processes occurring in two or three phase slurries comprising a slurry liquid in which is dispersed or suspended (i) gas bubbles or (ii) gas bubbles and particulate solids are known and find use in a variety of applications, including conversion reactions in which a reactant is reacted with a hydrocarbonaceous or other feed, to convert the molecular structure of at least a portion of the feed. These reactions are typically conducted in the presence of a catalyst. Such reactors are sometimes referred to as ebulating bed reactors in which the upflowing gas and or liquid serve to expand and disperse the particulate solids which can comprises either part of the feed (e.g., coal liquefaction), the catalyst or other particles for various reactions. This includes slurry hydrocarbon synthesis reactions, in which bubbles of hydrogen and carbon monoxide react in the presence of a Fischer-Tropsch catalyst in a hydrocarbon slurry liquid, to form hydrocarbons. In such applications, heat transfer limitations between the slurry and indirect heat exchange means for removing or adding heat to the slurry in the reactor, can reduce the efficiency of the reaction and limit the reactor production at a given temperature. For example, the Fischer-Tropsch hydrocarbon synthesis reaction is highly exothermic. This can limit hydrocarbon production at a given temperature, due to heat transfer limitations between the slurry and the indirect heat exchange cooling means immersed in it, inside the reactor. Such heat transfer means are typically finned or bare steam tubes, in which the cooling water flowing through them is converted into steam, as the means for removing heat from the slurry during the reaction.

SUMMARY OF THE INVENTION

It has now been found that the use of ribbed tubes or conduits as heat exchange means for indirect heat exchange with a two or three phase slurry, such as the three phase slurry in a slurry Fischer-Tropsch hydrocarbon synthesis reactor, provides greater heat transfer than conventional finned or plain heat exchange tubes. For a slurry hydrocarbon synthesis reaction, increased heat exchange with the slurry permits (i) the reactor to operate at a lower temperature at a given CO conversion, to maximize the production of higher molecular weight hydrocarbon products from the synthesis reaction, (ii) greater CO conversion at a given temperature, to increase the reactor productivity, or (iii) a combination of (i) and (ii). By ribbed tubes is meant one or more hollow heat exchange tubes or conduits having relatively shallow and low aspect ratio heat exchange protuberances, hereinafter referred to as "ribs", extending or protruding outward from the outer surface of each of the one or more tube or conduit heat exchange means. The ribs are aligned substantially parallel to, or spirally along, the flow direction of the gas bubbles in the slurry. The longitudinal axis of the one or more tubes or conduits will also typically be aligned in a direction generally parallel to the overall gas bubble flow direction through the slurry. When the longitudinal axis of the conduit is aligned parallel to the gas bubble flow direction, the ribs are thereby aligned parallel to, or spirally along, the conduit's longitudinal axis. For a slurry in a reactor in which the gas bubbles flow upward, this means that each heat exchange conduit will be aligned substantially vertically with respect to its longitudinal axis, and the ribs will be aligned substantially parallel to, or spirally along, the vertical, longitudinal axis of the conduit. By aligned spirally along the gas bubble flow direction or conduit longitudinal axis, is meant that the ribs are spirally aligned at an angle of less than 45 degrees away from the gas bubble flow direction, and preferably also less than 45 degrees away from the longitudinal axis of the conduit. Thus, the protuberances or ribs useful in the means of the invention will typically and preferably be axially or spirally aligned with respect to both the longitudinal axis of the heat exchange means and the direction of gas bubble flow. By a two or three phase slurry is meant a continuous slurry liquid in which is dispersed or suspended (i) gas bubbles or (ii) gas bubbles and particulate solids. The gas bubbles in the slurry may be flowing in more than one direction due to mixing, baffles and the like. However, in the practice of the invention gas bubble flow will be primarily in one direction, as is explained in more detail below.

The conduit and ribs comprising the heat exchange means of the invention are fabricated of heat conductive material, typically metal. The heat exchange means or ribbed tubes useful in the process of the invention are further characterized by the ribs having a height to width ratio (hereinafter "aspect ratio") of less than five, preferably less than 3 and more preferably less than 2. The ratio of the outer diameter of the tube or conduit, not including the ribs (the "base O.D."), to the rib height is preferably greater than 10. This gives the outer heat exchange surface of the tube or conduit a ribbed appearance and distinguishes the ribs from common heat exchange fins, for which the aspect ratio and the ratio of the base tube O.D. to the rib height are typically greater than 5 and less than 10, respectively. In the case of a conduit that is not circular in cross-section, its base O.D. is taken as the O.D. of a conduit having a circular cross-section, whose cross-sectional area is the same as that of the non-circular conduit. This is known as the equivalent O.D. In a further preferred embodiment, the base O.D. of the conduit divided by the width of the channel or spacing between ribs is greater than 10. In a still further preferred embodiment, the thickness of the ribs divided by the width of the channel or spacing between the ribs, where they join the conduit, is greater than 1 and preferably greater then 2. When viewed in cross-section, these ribs have more of an appearance of short, stubby castellations, gear teeth, or coarse and even square-cut threads, rather than the relatively higher and typically flat fins of the prior art. The prior art fins typically extend out from the base conduit or tube, a distance substantially greater than (i) the width of the fin and (ii) the distance between fins. The heat transfer characteristics of the ribbed tubes have been found to be better in a two or three phase slurry comprising flowing gas bubbles in a continuous liquid phase, than conventional exchange tubes with or without fins.

In one embodiment the invention relates to a process for adding or removing heat to or from a slurry comprising a continuous slurry liquid phase, in which is dispersed or suspended (i) gas bubbles or (ii) gas bubbles and particulate solids, by indirect heat exchange with means located in the slurry which comprises one or more hollow conduits containing a heat exchange fluid flowing within, in indirect heat exchange relationship with the surrounding slurry, with the one or more conduits having a plurality of ribs or protuberances attached to and extending outward from the exterior surface thereof, and aligned longitudinally (substantially parallel to) or spirally along the flow direction of the gas bubbles, wherein the ribs have an aspect ratio of less than five, preferably less than 3 and more preferably less than 2. The ratio of the base O.D. of the one or more tubes or conduits to the rib height is greater than 10. In a further preferred embodiment, the ratio of the base O.D. of the conduit to the width of the channel or spacing between ribs is greater than 10. In a still further preferred embodiment, the thickness of the ribs divided by the width of the channel or spacing between the ribs at their junction with the base O.D. or outer surface of the conduit is greater than 1. A process according to the practice of the invention may comprise a chemical reaction or other process occurring in a reactor or other vessel containing a slurry, in which the heat exchange means is in indirect heat exchange with the slurry in which it is immersed, and either removes heat from, or adds heat to, the surrounding slurry. In a Fischer-Tropsch slurry hydrocarbon synthesis process, in which the slurry is a three phase slurry comprising a continuous liquid phase in which gas bubbles and solid catalyst particles are dispersed, the synthesis reaction is exothermic and coolant fluid flowing through the heat exchange means of the invention removes heat from the slurry.

DETAILED DESCRIPTION

Figure 1:
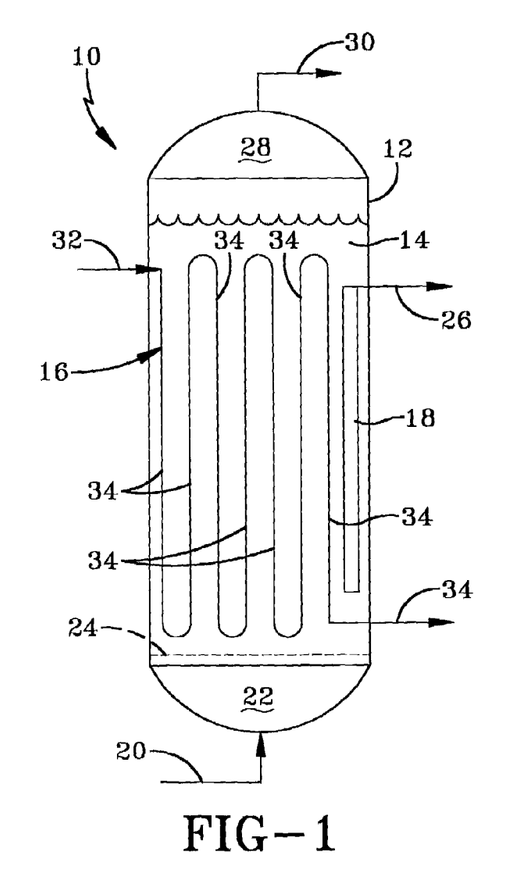
FIG. 1 is a simple cross-sectional schematic of a slurry hydrocarbon synthesis reactor, containing within a heat exchange means useful in the process of the invention.
Figure 2:
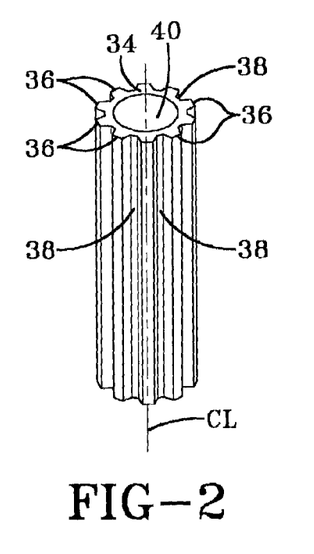
FIGS. 2 is a perspective view of a portion of a heat exchange means useful in the process of the invention, showing the ribs aligned parallel to the longitudinal axis of the tube.
Figure 3:
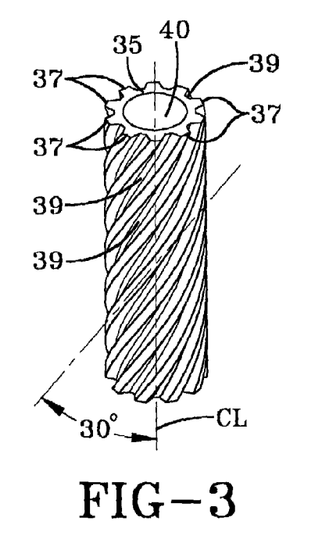
FIG. 3 is a perspective view of a portion of a heat exchange means useful in the process of the invention, in which the ribs are aligned spirally along the longitudinal axis of the tube.

Referring to FIG. 1, there is depicted in brief schematic cross-section, a slurry hydrocarbon synthesis reactor 10 comprising a vertical, cylindrical vessel 12 containing within a three-phase slurry 14, heat exchange means 16 and a liquid filter 18. The synthesis gas, which comprises a mixture of $H_2$ and CO, is fed into the reactor via line 20, up into the plenum area 22 and then through a gas distributor at the bottom of the slurry, simply shown as dashed line 24. Slurry 14 comprises gas bubbles and particles of a suitable hydrocarbon synthesis catalyst, dispersed in a slurry liquid that comprises hydrocarbon products of the synthesis reaction that are liquid at the conditions in the reactor. The bubbles comprise bubbles of synthesis gas and products of the synthesis reaction that are gaseous at the reaction conditions. Filter 18 enables removal of the synthesized hydrocarbon liquid from the reactor via line 26. As the synthesis gas rises up through the slurry, it reacts in the presence of the catalyst particles and forms hydrocarbons that are liquid at the reaction conditions in the reactor and a tail gas. The liquid hydrocarbons form the slurry liquid and are either continuously or intermittently removed from the reactor, via line 26. The tail gas comprises gaseous hydrocarbons, water vapor, $CO_2$ and unreacted synthesis gas. The tail gas collects in the gas space 28 above the slurry and is removed from the reactor via line 30. The hydrocarbon synthesis reaction is highly exothermic and the interior of the reactor must be cooled with a coolant, such as cooling water, in indirect heat exchange. The cooling water is passed, via line 32, into the heat exchange means 16, which in this illustration comprises a plurality of identical ribbed heat exchange tubes 34, useful in the practice of the invention, connected at their top and bottom as shown, to form a continuous conduit. Medium pressure steam exits the heat exchange means 16, via line 34. This steam will typically be used for power generation, for running pumps, compressors and other utilities. Only seven tubes 34 are shown for simplicity. In reality, there may be hundreds of vertically aligned, ribbed heat exchange tubes in the reactor, arranged in groups, with each group having a separate cooling water entrance and a separate steam exit. As shown, the gas flow in the reactor is parallel to the longitudinal axis of each tube, due to their vertical alignment in the reactor. The vertical ribbed heat exchange tubes 34, have ribs aligned either parallel to the vertical, longitudinal axis of each tube as shown in FIG. 2, or they may be spirally aligned along and around the vertical, longitudinal axis of each tube as shown in FIG. 3. In either case, it will be clear that the alignment of the ribs is parallel or spiral to both the longitudinal axis of the tube and to the overall direction of the gas flow which, in this case, is vertically upward. There will also be some amount of horizontal gas flow in the reactor, due to turbulence. However, the primary and overall gas flow direction is vertical (vertically upward). Using the ribbed tubes of the invention permits running the reactor cooler for less methane make and for higher average molecular weight of the synthesized hydrocarbons, particularly with a catalyst comprising a cobalt catalytic component. Alternately, using the heat exchange means of the invention will permit a higher synthesis gas feed rate into the reactor, for greater reactor productivity, with no temperature increase compared to conventional heat exchange tubes of the prior art. In a hydrocarbon synthesis process, water is typically used as the cooling fluid in the heat exchange means in the reactor and is turned to steam as a consequence of the heat exchange. Yet another advantage of the present invention is that, due to the greater heat transfer is achieved from the heat exchange means used in the practice of the invention, higher pressure steam can be produced from the cooling water. For a slurry hydrocarbon synthesis reactor, this can be, for example, as much as a 15 psia increase; for medium pressure steam (e.g., ~150 psia), this is a significant difference, particularly if the steam is going to be used for a utility, such as a power turbine.

FIG. 2 illustrates a perspective view of a typical ribbed heat exchange tube useful in the practice of the invention, in which the ribs are aligned parallel to the longitudinal axis of the tube. Thus, tube 34 is shown as hollow, cylindrical and elongated, having ten ribs 36 extending radially outward from its outer surface 38, with bore 40 inside providing the flow conduit for the cooling water. FIG. 3 is a perspective of a heat exchange means useful in the practice of the invention which is similar to that of FIG. 2, but with the ribs aligned spirally along the longitudinal axis of the tube. In this illustration, the spiral angle is 30 degrees off the longitudinal axis of the tube, as indicated and shown in the Figure. Thus, ribs 37 spirally wind around the tube 35, at a 30 degree angle to its longitudinal (vertically oriented in this illustration) axis. The number 39 refers to the space between each rib, at the junction of the ribs with the outer surface of the base tube. This junction occurs at the base O.D. of the tube, which is the tube O.D., not including the ribs. Bore 41 extends vertically through the tube. In contrast, FIGS. 4(a), 4(b) and 4(c) respectively illustrate a top plan view, a schematic side view and a perspective view of a conventional, prior art cylindrical, hollow and elongated finned heat exchange tube 42, not useful in the process of the invention. Tube 42 has a plurality of ribs or fins 44, extending radially outward and circumferentially aligned around the outer tube surface, perpendicular to the longitudinal axis of the tube. Bore 46 extends through the tube. For the sake of simplicity, the O.D. of the tube not including the fins (the base O.D.), is labeled only once as 43. In this case, the longitudinal axis of tube 42 is aligned in a direction parallel to the expected gas bubble flow direction, but the fins are aligned on it in a direction transverse to the expected overall gas flow direction. This is outside the scope of the present invention. Also outside the scope of this invention is a conventional, prior art finned heat exchange tube, in which the fins are aligned parallel to the longitudinal axis of the tube.

FIGS. 5, 6, 7 and 8 all represent flattened sections of heat exchange tubes, to further illustrate the differences between heat exchange means useful in the practice of the invention (FIGS. 5–7) and a conventional prior art (i) finned tube (FIG. 8) or (ii) plain steam tube without fins or other protuberances (not shown). Thus, turning to FIGS. 5(a) and 5(b), a flat section of a tube 50, similar to that shown in FIG. 2, is shown as having a plurality of parallel ribs 54, arrayed across the outer (upper for the flat section) or base surface 52 of section 50. Due to the close spacing of the bottom portions of the ribs where they combine with the outer surface of the tube 50 at its base O.D., the base O.D. surface of 50 is not readily discernable. A slight fillet or curvature exists at 52, where the sidewalls of adjacent ribs meet at the base. Thus, each of the plurality of ribs 54 form a part of, and extend upwardly, from the base O.D. surface 52. This is a flattened section of a ribbed tube similar to FIG. 2. In this case, the protuberances 54 extend radially out from the tube's O.D. and are parallel to the longitudinal axis of the tube, as is shown by ribs 36 extending radially outward of and parallel to the longitudinal axis of the ribbed tube shown in FIG. 2. The spacing shown between the outermost part of these ribs in the flattened section is less than what it would be on a tube, due to the increased distance resulting from the curvature of the tube. This illustrates the type A parallel ribbed tube described in the Tables and Examples below.

Figures 5A, 5B:
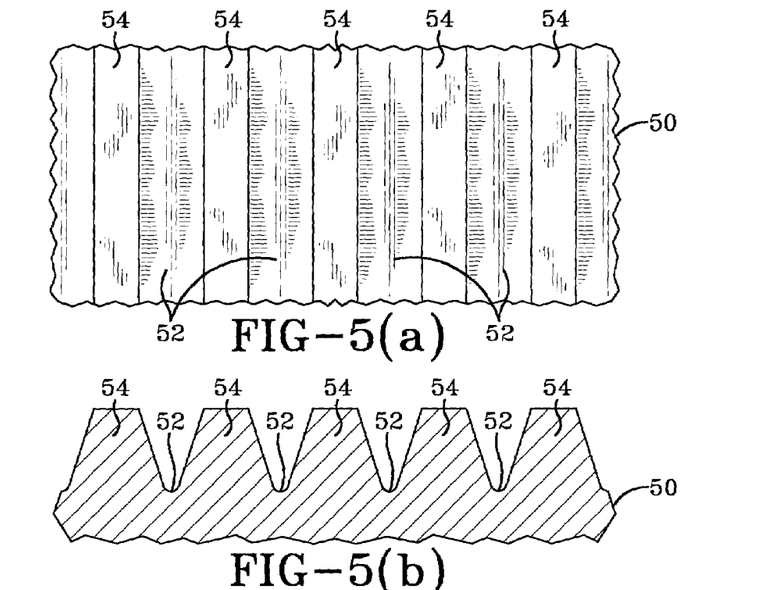
FIGS. 5(a) and 5(b) show respective partial top plan and cross-sectional side views, of a flattened section of a heat exchange means useful in the process of the invention, similar to that shown in FIG. 2, in which the ribs are aligned parallel to the longitudinal axis.
Figures 6A, 6B:
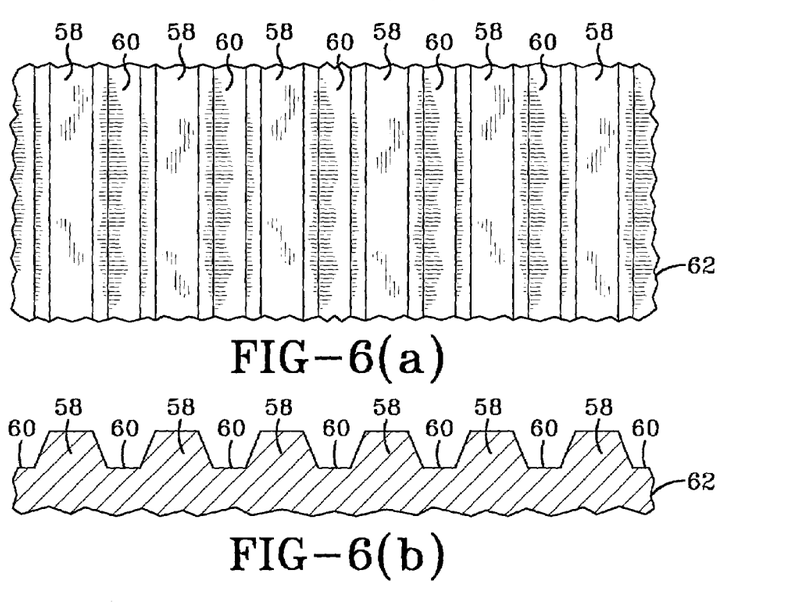
FIGS. 6(a) and 6(b) show another embodiment of a flattened section of heat exchange means useful in the process of the invention, similar to that shown in FIGS. 5(a) and 5(b).
Figure 7A:
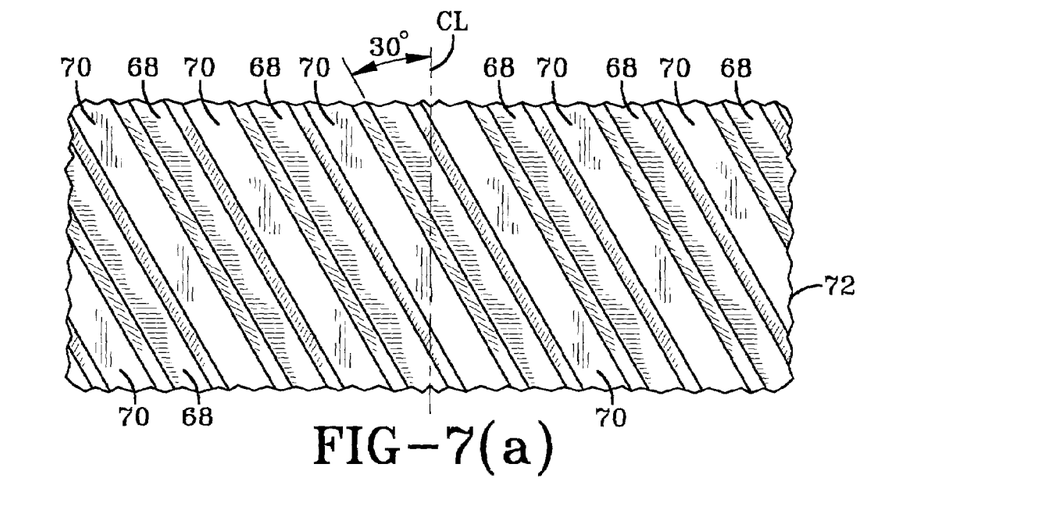
FIGS. 7(a) and 7(b) show respective partial top plan and cross-sectional side views of a flattened section of another embodiment a heat exchange means useful in the process of the invention, in which the ribs are aligned spirally along the axis of the means, as is shown in FIG. 3.
Figure 7B:
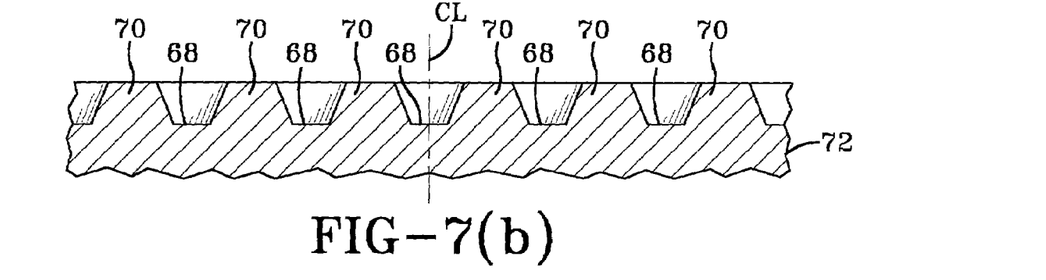

FIGS. 6(a) and 6(b) also show a flat section of a tube similar to that shown in FIG. 2, but which, compared to that of FIG. 5, is more like the axialB type ribbed tube in the Tables below, in which the ribs are shorter and spaced further apart than those in FIG. 5. In this case the upper surface 60, which is the base O.D. of the tube, is readily discernable, due of the wider spacing of the ribs at their junction with that surface. The proportions shown in FIGS. 5–8, while not exactly to scale, have been drawn in an attempt to show the magnitude of the dimensional differences, characterized in the Tables and Examples below, between the axialA, axialB and spiralB type ribbed tubes, and the fins of the conventional finned tube. FIGS. 7(a) and 7(b) show a flat section of a tube similar to that shown in FIG. 3, in which the ribs are at an angle of 30 degrees to the longitudinal axis of the tube. Except for the 30 degree rib alignment angle, the rib height and spacing are the same as for the axialB type flat of FIG. 6. In FIG. 7, the ribs 68 extending up from the flat, upper surface 68 of section 72 are shown aligned at a 30 degree angle from the longitudinal axis of the tube, indicated by the center line shown in the Figure. In cross-section, the top 74 of the ribs is seen in FIG. 7(b) as extending across the entire section.

In these particular embodiments and in contrast to prior art conventional heat exchange tubes, it is seen that the side walls of ribs of the means of the present invention extend radially outward at an angle of less than 90 degrees to the surface from which they depend. The adjacent sides of adjacent ribs are also angled away from each other in the outward direction. It is therefore also seen that the thickness of each rib is greatest at its junction with the outer tube or conduit surface (base O.D.) and least at its outermost portion (overall O.D.). While this particular rib construction has been found to work in the process of the invention and is preferred for use with a three phase slurry comprising a liquid phase in which is dispersed gas bubbles and particulate solids, the invention is not intended to be so limited.

Figure 4A:
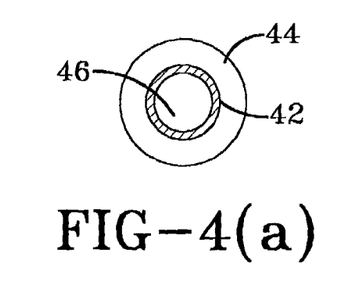
FIGS. 4(a), 4(b) and 4(c) are respective top plan, schematic and perspective side views of a typical prior art finned tube heat exchange means, in which the ribs aligned transverse to the longitudinal axis.
Figure 4B:
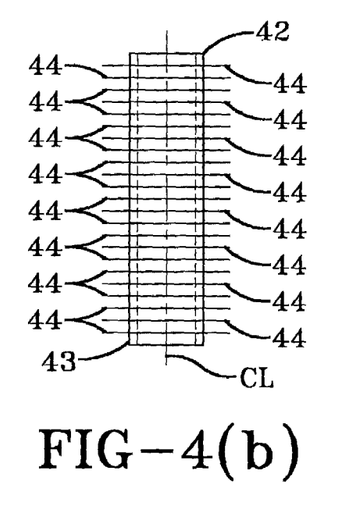
Figure 4C:
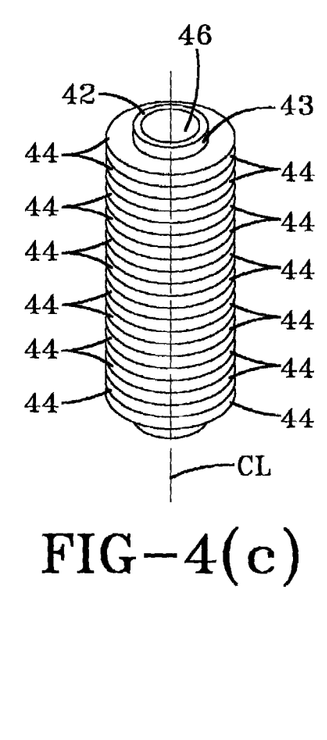
Figure 8A:
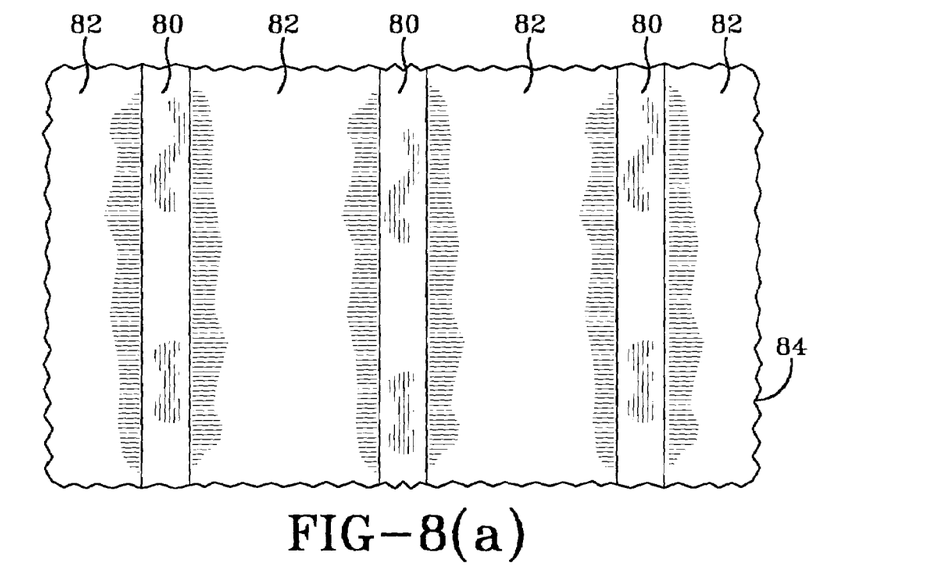
FIGS. 8(a) and 8(b) illustrate respective partial top plan and cross-sectional side views of a flattened section of a conventional finned prior art heat exchange means, of the type shown in FIG. 4, but in which the fins are aligned along the longitudinal axis.
Figure 8B:
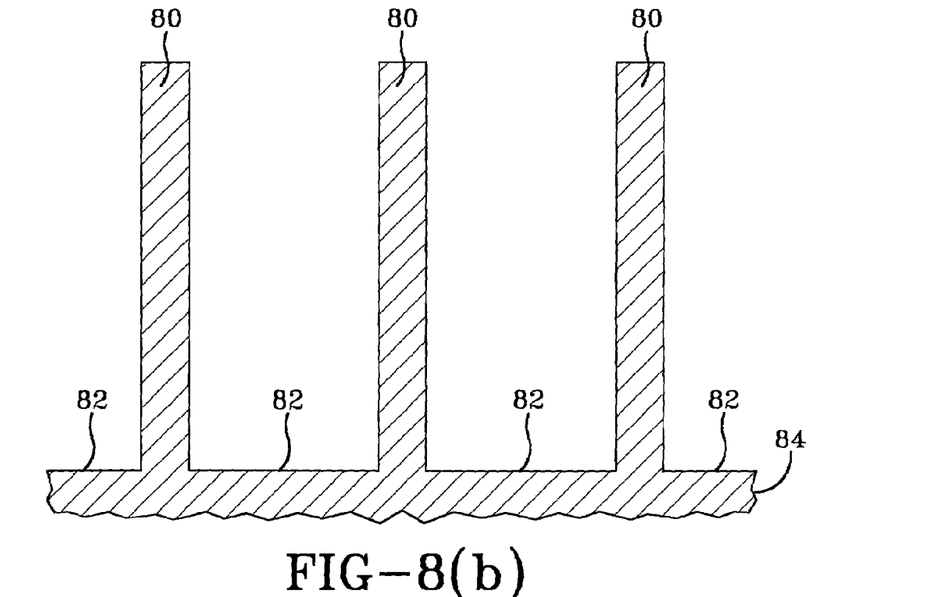

FIGS. 8(a) and 8(b) respectively illustrate a brief top plan and side cross-sectional view of a flattened section 84, of a conventional prior art finned tube similar to that shown in FIG. 4, but wherein the fins 80 are aligned parallel to the longitudinal axis of the tube. This corresponds to the conventional, prior art finned tube referred to in the Tables below. The substantially higher fins 80 and concomitant greater aspect ratio, compared to the ribs for the three tubes useful in the practice of the invention, is immediately obvious from the Figures. Surface 82 is the base O.D. surface of the tube from which the fins depend.

With respect to a slurry Fischer-Tropsch hydrocarbon synthesis reaction and reactor, briefly schematically shown in FIG. 1, as is known, in a slurry Fischer-Tropsch hydrocarbon synthesis process, a synthesis gas feed comprising a mixture of $H_2$ and CO is bubbled up into a slurry in which the $H_2$ and CO react in the presence of a suitable catalyst, under reaction conditions effective to form hydrocarbons, and preferably mostly liquid hydrocarbons. Slurry hydrocarbon synthesis process reaction conditions vary somewhat depending on the catalyst and desired products. Typical conditions effective to form hydrocarbons comprising mostly $C_{5+}$ paraffins, (e.g., $C_{5+}$–$C_{200}$) and preferably $C_{10+}$ paraffins, in a slurry hydrocarbon synthesis process employing a catalyst comprising a supported cobalt component include, for example, synthesis reaction temperatures and pressures in the range of from about 320–600° F., 80–600 psi, and an hourly gas space velocity of the synthesis gas feed in the range of from 100–40,000 V/hr/V, expressed as standard volumes of the gaseous CO and $H_2$ mixture (60° F., 1 atm) per hour per volume of catalyst. A catalyst comprising a catalytic cobalt component is known to produce hydrocarbons, most of which are liquid and solid at room temperature and pressure, but liquid at the reaction conditions. While the mole ratio of the hydrogen to the carbon monoxide in the gas may broadly range from about 0.5 to 4, the stoichiometric consumption mole ratio for a slurry Fischer-Tropsch hydrocarbon synthesis reaction is typically about 2.1, in a slurry hydrocarbon synthesis process conducted under non-shifting conditions. A synthesis gas having other than a stoichiometric $H_2$ to CO mole ratio may also be used, as is known, a discussion of which is beyond the scope of the present invention, as is production of the synthesis gas feed.

Hydrocarbons produced by a slurry hydrocarbon synthesis process are typically upgraded to more useful products, by subjecting all or a portion to fractionation and/or conversion. By conversion is meant one or more operations in which the molecular structure of at least a portion of the hydrocarbon is changed and includes both noncatalytic processing (e.g., steam cracking), and catalytic processing in which a fraction is contacted with a suitable catalyst, with or without the presence of hydrogen or other coreactants. If hydrogen is present as a reactant, such process steps are typically referred to as hydroconversion and include, for example, hydroisomerization, hydrocracking, hydrorefining and the more severe hydrorefining referred to as hydrotreating. Illustrative, but nonlimiting examples of suitable products formed by upgrading include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

In one embodiment therefore, the invention relates to a slurry Fischer-Tropsch hydrocarbon synthesis process, in which bubbles of synthesis gas are passed up into and through a three phase slurry in a slurry reactor, wherein the slurry comprises gas bubbles and particulate catalyst particles in a hydrocarbon slurry liquid, wherein the CO and $H_2$ in the synthesis gas react to form hydrocarbons, at least a portion of which are liquid at the reaction conditions and comprise the slurry liquid, and wherein heat from the exothermic synthesis reaction is removed from the reactor by heat exchange means of the invention immersed in the slurry. The bubbles of synthesis gas in the reactor flow primarily up from the bottom of the slurry to the top. Gaseous and vapor products of the reaction form bubbles which also rise up to the top. While there may be some minor lateral gas bubble flow, the overall gas bubble flow in the reactor is vertically upward. Thus, the longitudinal axis of the heat exchange means is substantially vertical and the ribs of the means are aligned substantially parallel to, or spirally along, the vertical longitudinal axis of the one or more conduits comprising the means. However, in some cases, other than for a slurry hydrocarbon synthesis reactor, the slurry may be flowing through a reactor or other vessel in a primarily horizontal direction. By way of an illustrative, but nonlimiting example, for a slurry flowing substantially horizontally through a vessel, it is preferred that the conduit means of the invention will be aligned substantially horizontal, and therefor parallel to, the primary flow direction of the slurry. The ribs will be aligned parallel to or spirally along the horizontal axis of the one or more conduits.

With more specific reference to a slurry Fischer-Tropsch hydrocarbon synthesis process, the invention comprises contacting a synthesis gas comprising a mixture of $H_2$ and CO with a particulate hydrocarbon synthesis catalyst in a slurry comprising the catalyst and gas bubbles in a hydrocarbon slurry liquid, in which the $H_2$ and CO react under reaction conditions effective to form hydrocarbons and heat from the synthesis gas and reaction, wherein at least a portion of the synthesized hydrocarbons are liquid at the reaction conditions and form the slurry liquid, wherein the gas bubbles rise up through the slurry and wherein heat is removed from the slurry by indirect heat exchange means in the slurry comprising one or more hollow conduits containing a heat exchange fluid flowing within, in indirect heat exchange relationship with the surrounding slurry, with the one or more conduits having a plurality of ribs or protuberances attached to and extending outward from the exterior surface thereof, wherein said one or more conduits each have a longitudinal axis and are vertically oriented along vertically upward gas bubble flow direction in the slurry, wherein said ribs are aligned parallel to or spirally along the longitudinal axis of the conduits, and wherein the ribs have an aspect ratio of less than five.

The invention will be further understood with reference to the examples below.

EXAMPLES

A hollow, cylindrical column having a diameter of 9¼ inches was constructed of Plexiglasse® It had a porous gas distributor plate fabricated of sintered glass at the bottom, above which was the two or three-phase slurry in which the heat exchange tubes to be evaluated were suspended. The gas distributor was pervious to gas, but not water, with an average pore size of about 45 μm. The static height of the liquid or the liquid and glass bead mixture in the column above the gas distributor plate, prior to introducing the gas flow, was about 60 inches. The column was operated in both two and three phase slurry modes. A three-phase slurry comprising a liquid continuous phase containing gas bubbles and particulate solids, is often referred to as simply a slurry. The gas was introduced into the liquid from a plenum section beneath the porous distributor plate, from which it bubbled up into, through and out the top of the liquid. In the three phase slurry operation mode, glass beads were added to the water to form a mixture of 25 wt. % glass beads and 75 wt. % water. The static height of the water or the water and glass bead mixture prior to introducing the gas, was about 60 inches. The air flow rate into the column was measured using a rotameter. For each run, two straight sections of the same type of heat transfer tube were used, each about 80 inches long and laterally spaced apart about 4 inches from center to center, along their vertical, longitudinal axes. The two sections were joined at the bottom by two elbows and a short smooth tube, and were placed in the column with a 6 inch clearance above the gas distributor plate at the bottom. Water, heated to a temperature of about 85° C., was pumped from a hot water reservoir into and through the tubes and then back into the reservoir. The types and dimensions of the heat transfer tubes used and evaluated are set forth in Table 1 below. In all cases, the ribs or fins were either vertically aligned or spirally aligned in a direction 30 degrees off vertical, along the longitudinal axis of the tube, and parallel to the upward gas flow direction through the column. In previous experiments it had been determined that unsatisfactorily low heat exchange was experienced in all cases, if the ribs or fins were aligned substantially (e.g., $\geq 45$ degrees and typically 90 degrees) perpendicular to both the upward gas flow direction and the longitudinal axis of the vertical tubes.

TABLE 1

| Tube Type | Tube I.D. inches | Base O.D. of tube, inches | Overall O.D., inches | Ribs/inch (base O.D.) | Ribs/tube |
|---|---|---|---|---|---|
| 1" steam pipe | 1.049 | 1.315 | 1.315 | none | none |
| Ribbed-axialA | 0.912 | 1.115 | 1.25 | 11 | 38 |
| Ribbed-spiralB | 0.784 | .930 | 1.0 | 11 | 32 |
| Ribbed-axialB | 0.784 | .930 | 1.0 | 11 | 32 |
| Conventional | 0.8 | 1.0 | 1.75 | 5.1 | 16 |

Base O.D. refers to the O.D. of the base tube only, not including the ribs or fins.
Overall O.D. refers to the overall outer diameter, including the ribs on the ribbed tubes and the fins on the conventional finned tube. Conventional refers to a conventional finned heat exchange tube, whose tube outer diameter, not including the fins, is 1.0", and with the fins axially aligned.

The two axialB tubes had the same dimensions, with the difference being that ribs on the spiral tube were aligned in a spiral, thirty degrees off vertical, along the longitudinal axis. The ribs on the axialA tube were vertically aligned along the longitudinal axis of the tube, but the dimensions of the ribs and tubes were different from the axialB tubes, as shown. The conventional, prior art finned tube was obtained from the Brown Fintube Company in Houston, Tex. The axialA ribbed tube was obtained from the UOP Company. The spiralB and axialB ribbed tubes were made to order and obtained from the Fintube Company in Oklahoma City. Temperature measurements were made using thermocouples. Preliminary tests showed the temperature distributions in both modes of operation were uniform throughout the column. Surface temperatures of the heat exchanger tubes were measured by thermocouples cemented in milled grooves at six axially (vertically) spaced locations, along each tube. Experimental results also indicated that the structure of the protuberances did not significantly influence the macroscopic flow structure of the slurry and gas bubbles past the tube surface. All of the values given in the Tables 2 through 7 below are based on a the same unit length per tube, with the rate being the rate based on the heat transfer coefficient times the total outer surface area (H×A) of each tube, per unit length.

Three-phase Slurry Operating Mode

The average heat transfer coefficients (H) and heat transfer rates (H×A) for the various ribbed and conventional heat exchange tubes in the three phase slurry operating mode are given in Tables 2 and 3 below. In this mode, the column contained a three-phase slurry comprising water, glass beads and uprising air bubbles. The results are presented as a function of the gas velocity, $U_g$.

TABLE 2

HEAT TRANSFER COEFFICIENTS*

| Gas Velocity $U_g$, in cm/s | 1" pipe | Ribbed axialA | Ribbed spiralB | Ribbed axialB | Conv. axial |
|---|---|---|---|---|---|
| $U_g$ = 5 cm/s | 4.0 | 4.0 | 4.8 | 3.9 | 1.3 |
| $U_g$ = 15 cm/s | 5.0 | 5.3 | 6.2 | 5.0 | 1.5 |
| $U_g$ = 25 cm/s | 5.0 | 6.0 | 7.3 | 5.5 | 1.8 |

*Kw/m² ° C.

TABLE 3

HEAT TRANSFER RATES*

| | 1" pipe | Ribbed axialA | Ribbed spiralB | Ribbed axialB | Conv. axial |
|---|---|---|---|---|---|
| $U_g$ = 5 cm/s | 0.42 | 0.60 | 0.53 | 0.43 | 0.50 |
| $U_g$ = 15 cm/s | 0.52 | 0.79 | 0.68 | 0.55 | 0.58 |
| $U_g$ = 25 cm/s | 0.52 | 0.90 | 0.80 | 0.61 | 0.69 |

*Kw

Two-phase Operating Mode

It was found that the presence of solids during the three phase slurry mode of operation made a significant difference, in both the heat transfer coefficients (H) and transfer rates (H×A). This is shown in Tables 4 and 5 below, which are for the same tubes run at the same conditions as in the three phase slurry mode which contained the glass beads, but in this case no glass beads were present. As above, the values are presented as a function of the gas velocity, $U_g$, in cm/s.

TABLE 4

HEAT TRANSFER COEFFICIENTS*

| Gas Velocity $U_g$, in cm/s | 1" pipe | Ribbed axialA | Ribbed spiralB | Ribbed axialB | Conv. axial |
|---|---|---|---|---|---|
| $U_g$ = 5 cm/s | 4.2 | 6.6 | 4.5 | 4.2 | 1.5 |
| $U_g$ = 15 cm/s | 4.5 | 8.8 | 5.5 | 4.5 | 1.8 |
| $U_g$ = 25 cm/s | 4.6 | 9.5 | 6.5 | 5.0 | 2.0 |

*Kw/m² ° C.

TABLE 5

HEAT TRANSFER RATES*

| Gas Velocity $U_g$, in cm/s | 1" pipe | Ribbed axialA | Ribbed spiralB | Ribbed axialB | Conv. axial |
|---|---|---|---|---|---|
| $U_g$ = 5 cm/s | 0.44 | 0.99 | 0.50 | 0.46 | 0.58 |
| $U_g$ = 15 cm/s | 0.47 | 1.32 | 0.61 | 0.50 | 0.69 |
| $U_g$ = 25 cm/s | 0.48 | 1.42 | 0.72 | 0.55 | 0.77 |

*Kw

Normalized Heat Transfer Rates for Both Modes

The actual enhancement achieved by the ribbed tubes as compared to the plain surfaced steam tube and the conventional finned heat exchange tube, must be viewed in terms of the actual heat transfer potential of each tube. This is based on the amount of cross-sectional area each tube will occupy in a reactor. Thus, the smaller the overall cross-sectional area of a particular tube, the more tubes may be used in a given reactor. All of the values given in Tables 6 and 7 below are therefore the averaged enhanced heat transfer rate, normalized to the 1" steam pipe O.D.*

TABLE 6

Averaged Enhanced Heat Transfer Rate - Normalized to 1" O.D.Steam Pipe*

| | 1" steam pipe | | Ribbed axialA | | Ribbed spiralB | | Ribbed AxialB | | Conventional axial fins | |
|---|---|---|---|---|---|---|---|---|---|---|
| | B | S | B | S | B | S | B | S | B | S |
| $U_g$ = 5 cm/s | .44 | .42 | 1.04 | .83 | .66 | .70 | .61 | .57 | .44 | .36 |
| $U_g$ = 15 cm/s | .47 | .52 | 1.39 | .61 | .80 | .89 | .66 | .72 | .52 | .44 |
| $U_g$ = 25 cm/s | .48 | .52 | 1.49 | .95 | .95 | 1.05 | .72 | .80 | .56 | .52 |

Note:
HA value times the steam tube O.D. divided by the overall ribbed O.D.
(e.g., HA × (1.315/O.D.) = Averaged enhanced HA)
B = two phase slurry
S = three phase slurry

TABLE 7

Averaged % Enhanced Heat Transfer Rate - Normalized to 1" O.D.Steam Pipe*

| | 1" steam pipe | | Ribbed axialA | | Ribbed spiralB | | Ribbed axialB | | Conventional axial fins | |
|---|---|---|---|---|---|---|---|---|---|---|
| | B | S | B | S | B | S | B | S | B | S |
| $U_g$ = 5 cm/s | 0 | 0 | 136 | 50 | 50 | 67 | 28 | 36 | 0 | −14 |
| $U_g$ = 15 cm/s | 0 | 0 | 196 | 60 | 70 | 71 | 40 | 39 | 11 | −15 |
| $U_g$ = 25 cm/s | 0 | 0 | 210 | 83 | 98 | 102 | 50 | 54 | 17 | 0 |

Note:
Based on data in Table 6 (above).

These results clearly demonstrate that the ribbed tubes are far superior at the same overall O.D., in terms of heat transfer per unit of cross-sectional area, than heat exchange tubes with conventional fins, and plain steam tubes. The use of the ribbed tubes permits the use of more tubes per unit of cross-sectional area, and consequently far superior overall heat exchange in a reactor or other vessel, in which heat transfer is desired in a two or three-phase slurry environment comprising a continuous liquid phase which contains gas bubbles, or gas bubbles and particulate solids.

Evaluation of Essential Features of Ribbed Means

Table 8 contains the dimensions of the ribs and fins on the tubes used in the study, with emphasis on the base and overall tube O.D. and the dimensions of the ribs or fins.

TABLE 8

| Tube Type | Rib width at overall O.D. | Rib width at base | Rib height | Channel Width B T Avg. | | |
|---|---|---|---|---|---|---|
| ¾" steel pipe | — | — | — | — | — | — |
| Ribbed-axialA | .040 | .090 | .070 | .00175 | .0633 | .033 |
| Ribbed-spiralB | .040 | .070 | .035 | .022 | .0581 | .040 |
| Ribbed-axialB | .040 | .070 | .035 | .022 | .0581 | .040 |
| Conventional | .035 | .035 | .375 | .161 | .309 | .253 |

B is the spacing between the ribs at bottom of the ribs, which is at the base O.D. of the tube.
T is the spacing between the ribs at top of the ribs, which is at the overall O.D. of the base tube plus the ribs or fins.

Based on the data given in Tables above, the relative dimensionless ratios shown in Table 9 and 10 indicate those features which distinguish the ribbed tubes useful in the process of the invention, from the smooth and finned surface tubes of the prior art.

TABLE 9

| Tube Type | Aspect ratio (base thk) | Aspect ratio (top thk) | Aspect ratio Average | Base O.D. ÷ rib height |
|---|---|---|---|---|
| 1" steam pipe | — | — | — | — |
| Ribbed-axialA | .778 | 1.75 | 1.264 | 15.9 |
| Ribbed-spiralB | .5 | .875 | .688 | 26.6 |
| Ribbed-axialB | .5 | .875 | .688 | 26.6 |
| Conventional | 10.7 | 10.7 | 10.7 | 2.67 |

Aspect ratio is the height of the fin or rib divided by its width at the top (top thk) and where the rib or fin join to the base O.D. at the bottom of the rib or fin (base thk).

TABLE 10

| Tube Type | Base O.D. ÷ channel width Bottom | Top | Rib thickness ÷ channel width Bottom | Top |
|---|---|---|---|---|
| 1" steam pipe | | | | |
| Ribbed-axialA | 634 | 17.5 | 51.4 | .63 |
| Ribbed-spiralB | 42.3 | 16.0 | 3.2 | .69 |
| Ribbed-axialB | 42.3 | 16.0 | 3.2 | .69 |
| Conventional | 6.2 | 3.2 | .22 | .11 |

In all cases there is a clear and distinguishing difference between the dimensionless ratios of the tubes useful in the invention and those of the prior art. The largest difference is in the aspect ratio of the heat exchange projections that extend radially away from the tube surface. However, the ratio of the base O.D. of the tube (not taking into account the projections) to the rib or fin height, as well as the ratio of the base O.D. to the channel width or spacing between the ribs or fins, particularly at their bottom, are also significant and not to be overlooked. The latter two dimensionless numbers take into account the dimensionless differences of the projections to the tube size and rib spacing.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for adding or removing heat to or from a slurry comprising a liquid phase and at least one of (i) flowing gas bubbles and (ii) a flowing gas bubbles and particulate solids, by indirect heat exchange with means located in the slurry, wherein said means comprises one or more hollow conduits containing a heat exchange fluid flowing within, in indirect heat exchange relationship with said surrounding slurry, with each of said one or more conduits having a plurality of ribs attached to and extending outward from its exterior and wherein said ribs have an aspect ration of less than five.

2. A process according to claim 1 wherein said one or more conduits and said ribs are heat conductive.

3. A process according to claim 2 wherein the ratio of the base O.D. of said one or more tubes or conduits to the height of said ribs is greater than 10.

4. A process according to claim 3 wherein each of said conduits has a longitudinal axis aligned parallel to the flow direction of said gas bubbles.

5. A process according to claim 4 wherein said aspect ratio is less than 3.

6. A process according to claim 5 wherein the ratio of said base O.D. to the width of the channel or spacing between said ribs is greater than 10.

7. A process according to claim 6 wherein the thickness of said ribs divided by the width of the channel or spacing between them is greater than 1.

8. A process according to claim 7 wherein said aspect ratio is less than 2.

9. A process for increasing the production of higher molecular weight hydrocarbon products from a hydrocarbon synthesis reaction in a slurry hydrocarbon synthesis reactor in which said slurry comprises a particulate catalyst and flowing gas bubbles in a slurry hydrocarbon liquid, said process comprising reducing the reaction temperature without reducing the conversion of the CO feed passed into said reactor, by increasing indirect heat exchange in said slurry using heat conductive heat exchange means in said slurry, said means comprising one or more hollow conduits containing a heat exchange fluid flowing within, in indirect heat exchange relationship with said surrounding slurry, with each of said one or more conduits having a plurality of ribs attached to and extending outward from its exterior surface wherein said ribs have an aspect ration of less than five, and wherein at least a portion of said synthesized hydrocarbons are upgraded by one or more upgrading operations.

10. A process according to claim 9 wherein said conduits have a longitudinal axis aligned substantially vertically in said slurry and wherein said ribs are aligned substantially parallel to or spirally along said longitudinal conduit axes.

11. A process according to claim 10 wherein the ratio of the base O.D. of said one or more tubes or conduits to the height of said ribs is greater than 10.

12. A process according to claim 11 wherein the ratio of said base O.D. to the width of the channel or spacing between said ribs is greater than 10.

13. A process according to claim 12 wherein said aspect ratio is less than 3.

14. A process according to claim 13 wherein the thickness of said ribs divided by said width of said channel or spacing between them at their bottom is greater than 1.

15. A process for increasing theproduction of hydrocarbon products from a hydrocarbon synthesis reaction in a slurry hydrocarbon synthesis reactor, in which said slurry comprises a particulate catalyst and flowing gas bubbles in a slurry hydrocarbon liquid, said process comprising increasing the conversion of the CO feed passed into said reactor at a given temperature, by increasing indirect heat exchange in said slurry which comprises one or more vertical, hollow conduits containing a heat exchange fluid flowing within, in indirect heat exchange relationship with said surrounding slurry, with each of said one or more conduits having a plurality of ribs attached to and extending outward from its exterior wherein said ribs have an aspect ration of less than five, and wherein at least a portion of said synthesized hydrocarbons are upgraded by one or more upgrading operations.

16. A process according to claim 15 wherein the ratio of the base O.D. of said one or more tubes or conduits to the height of said ribs is greater than 10.

17. A process according to claim 16 wherein the ratio of said base O.D. to the width of the channel or spacing between said ribs is greater than 10.

18. A process according to claim 17 wherein said aspect ratio is less than 3 and the thickness of said ribs divided by said width of said channel or spacing between them at their bottom is greater than 1.

19. A slurry hydrocarbon synthesis process comprises the steps of:

(a) contacting a synthesis gas comprising a mixture of $H_2$ and CO with a particulate hydrocarbon synthesis catalyst, in a slurry body comprising said particles of said catalyst and gas bubbles in a continuous phase hydrocarbon slurry liquid in a hydrocarbon synthesis reactor, in which said $H_2$ and CO react under reaction conditions effective to form hydrocarbons from said synthesis gas, along with heat produced by the exothermic synthesis reaction, wherein at least a portion of said synthesized hydrocarbons are liquid at the reaction conditions and form said slurry liquid and wherein said catalyst comprises at least one Group VIII catalytic metal component;

(b) removing at least a portion of said synthesized hydrocarbons from said reactor and then upgrading at least a portion thereof by one or more upgrading operations; and (c) removing a least a portion of said reaction heat from said reactor by heat exchange means immersed in said slurry therein, said heat exchange means comprising one or more vertical, elongated, hollow conduits containing a heat exchange fluid flowing within, in indirect heat exchange relationship with said surrounding slurry, with each of said one or more conduits having a plurality of ribs attached to and extending outward from its exterior wherein said ribs have an aspect ratio of less than five.

20. A process according to claim 19 wherein said catalyst comprises a catalytic cobalt component and a support component.

21. A process according to claim 20 wherein the ratio of the base O.D. of said one or more conduits to the height of said ribs is greater than 10.

22. The process of claims 1, 9, 15, or 19 wherein said ribs are aligned longitudinally along the flow direction of said gas bubbles.

23. The process of claims 1, 9, 15, or 19 wherein said ribs are aligned spirally along the flow direction of said gas bubbles.

24. A process according to claim 19 where said synthesized hydrocarbons comprise $C_5+$ hydrocarbons.

25. A process according to claim 24 wherein at least a portion of said $C_5+$ hydrocarbons are subjected to conversion.

26. A process according to claim 25 wherein said $C_5+$ hydrocarbons are subjected to a non-catalytic conversion in which the molecular structure of at least a portion of said hydrocarbon is changed.

27. A process according to claim 25 wherein said $C_5+$ hydrocarbons are subjected to a catalytic conversion in which the molecular structure of at least a portion of said hydrocarbon is changed.

28. A process according to claim 25 wherein a liquid fuel is the product of said conversion.

29. A process according to claim 25 wherein a lubricating oil is the product of said conversion.

30. A process according to claim 28 wherein said liquid fuel includes motor gasoline, diesel fuel, kerosene and jet fuel.

31. A process according to claim 29 wherein said lubricating oil includes automotive, jet, turbine and metal working oils.

* * * * *